F. R. HARBAUGH, OF PHILADELPHIA, PENNSYLVANIA.

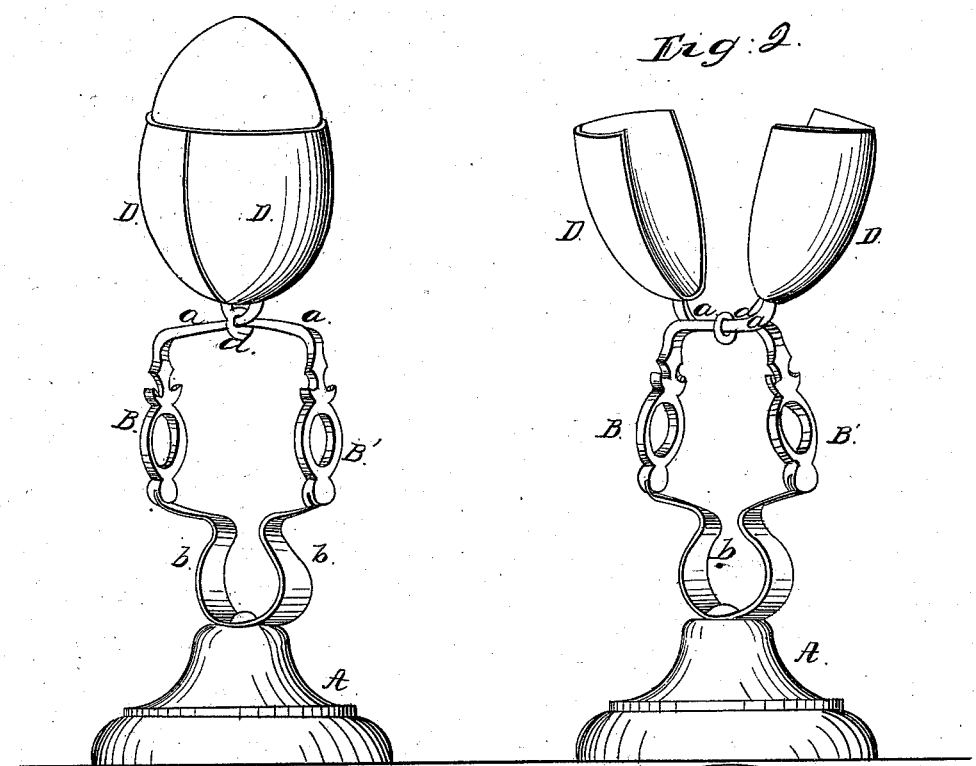

Letters Patent No. 83,281, dated October 20, 1868.

IMPROVED EGG-HOLDER.

The Schedule referred to in these Letters Patent and making part of the same.

*To all whom it may concern:*

Be it known that I, F. R. HARBAUGH, of Philadelphia, Pennsylvania, have invented an Improved Egg-Holder; and I do hereby declare the following to be a full, clear, and exact description of the same.

My invention consists of an egg-holder composed of a base, two elastic arms, and two sections of a cup, or their equivalents, the whole being constructed and arranged substantially as described hereafter, and forming an appropriate instrument for grasping and holding hot boiled eggs, in place of the ordinary egg-cups.

In order to enable others to make and use my invention, I will now proceed to describe its construction and operation, reference being had to the accompanying drawing, which forms a part of this specification, and in which—

Figures 1 and 2 are perspective views of my improved egg-holder, showing the parts in different positions;

Figure 3, a modification; and

Figure 4, another modification.

A represents the base of the holder, from which project the two arms, B and B', the lower portion of these arms consisting of a spring, $b$, which is riveted or otherwise secured to the base, A. The upper ends, $a$, of the arms are bent, as shown in the drawing, the bent end of one arm being adjacent to that of the other, and the two being coupled together by a ring, $d$, in such a manner that they are free to move independently of each other.

To the bent end of each arm is secured the section or half D of a cup, the spring $b$ having a tendency to maintain the two sections in contact with each other, as shown by fig. 1.

When it is desired to introduce an egg into the holder, the two arms B and B' are compressed towards each other, thereby separating the sections of the cup, as shown by fig. 2. The egg is then held in such a position between the sections, that on releasing the arms, it will, owing to their elasticity, be grasped by and between the said sections.

Or the handling of the hot boiled egg, with the view of introducing it into the holder, may be entirely dispensed with, and the instrument inverted, and used for grasping, in a manner which will be readily understood, any one of a number of eggs contained in a dish.

It is not essential that the arms B and B' should be partly rigid and partly elastic, as it will be readily seen that they may be made of a continuous spring, as seen in fig. 3.

Another modification of my invention is illustrated in fig. 4, where two semi-annular strips, $x\ x$, are substituted for the above-mentioned cups.

I claim as my invention, and desire to secure by Letters Patent—

The within-described egg-holder, composed of a base, A, two elastic arms, B and B', and two sections, D D, of a cup, or the equivalent to the same, the whole being constructed and arranged substantially as and for the purpose herein set forth.

In testimony whereof, I have signed my name to this specification in the presence of two subscribing witnesses.

F. R. HARBAUGH.

Witnesses:
H. HOWSON,
HARRY SMITH.